(12) United States Patent
Rawls

(10) Patent No.: US 8,240,710 B1
(45) Date of Patent: Aug. 14, 2012

(54) DETAHCABLE HAND RAIL FOR A RECREATIONAL VEHICLE

(76) Inventor: James L. Rawls, Monticello, AR (US)

( * ) Notice: Subject to any disclaimer, the term of this patent is extended or adjusted under 35 U.S.C. 154(b) by 318 days.

(21) Appl. No.: 12/460,696

(22) Filed: Jul. 23, 2009

(51) Int. Cl.
*B60R 99/00* (2009.01)

(52) U.S. Cl. ........... 280/762; 280/163; 182/82; 182/113

(58) Field of Classification Search .................. 280/762, 280/163, 164.1; 256/67, 69, 65.04, 65.05, 256/65.06; 296/156; 248/205.1, 274.1; 403/263; 182/82, 106, 113
See application file for complete search history.

(56) References Cited

U.S. PATENT DOCUMENTS

| | | | |
|---|---|---|---|
| 4,029,352 A | 6/1977 | Evans | |
| 4,261,550 A | 4/1981 | Gregory | |
| 4,664,227 A * | 5/1987 | Hansen | ........................... 182/82 |
| 5,024,420 A | 6/1991 | Downing | |
| 5,076,547 A | 12/1991 | Osterholm | |
| 5,116,025 A | 5/1992 | Kiniry | |
| D374,581 S | 10/1996 | Kiniry | |
| 5,646,371 A * | 7/1997 | Fabian | ............................. 174/58 |
| 5,857,800 A * | 1/1999 | Nell | .............................. 403/344 |
| 6,425,572 B1 | 7/2002 | Lehr | |
| 6,843,468 B2 | 1/2005 | Marshall et al. | |
| D509,905 S | 9/2005 | Baker | |
| 7,007,366 B1 | 3/2006 | Eby | |

\* cited by examiner

*Primary Examiner* — John Walters
(74) *Attorney, Agent, or Firm* — Montgomery Patent & Design, LLC; Robert C. Montgomery; Joseph Yaksich

(57) ABSTRACT

A removable handrail system for recreational vehicles and similar vehicles is herein disclosed, located and installed along side steps of said vehicles and used to access the door or other similar location. It is intended for use on motor homes, fifth wheels, travel trailers, truck campers and virtually any vehicle which utilizes one (1) or more steps for access and comprises a hitch-like receiver assembly that mounts on the side of the step assembly directly underneath the door or upper platform. The handrail slides into the receiver and is secured via a locking bolt. The handrail is adjustable to compensate for varying grades. When fully installed, the device is supported at two (2) points and forms a very stable handrail for entering and exiting the vehicle. It is quickly installed and removed with a minimum of tools and can be stored in a narrow storage compartment when not in use.

7 Claims, 6 Drawing Sheets

DETAHCABLE HAND RAIL FOR A RECREATIONAL VEHICLE

RELATED APPLICATIONS

The present invention was first described in a notarized Official Record of Invention filed on Mar. 24, 2008 at the offices of Montgomery Patent and Design in Washington, Pa. There are no previously filed, nor currently any co-pending applications, anywhere in the world.

FIELD OF THE INVENTION

The present invention relates generally to handrail assemblies for stairs and steps and, more particularly, to an attachable hand rail and bracket assembly for use with vehicle entryway steps.

BACKGROUND OF THE INVENTION

Millions of Americans enjoy camping and traveling as their preferred leisure time activity. A great number of these people choose to do so in recreational vehicles (RV's) that range in size from small pop-up campers that are designed to be towed behind a car or truck to large motorized RV's with integral engines. Most of these vehicles have a floor system that is several feet about ground level. As such, they must be accessed with a step system that provides at least one (1) step depending on the height of the vehicle entryway. However, hand rails are typically not provided. When hand rails are provided, they are typically only a small collapsible handle that may extend outward only a short distance. One (1) solution to this problem has been the use of attachable hand rails that adjacently mount to the steps of the vehicle. Typically these attachable hand rails also swing out when in use and fold away when not in use and are ordinarily unstable and come no where near the bottom of the steps, at grade level, where a conventional permanent stairway hand rail would be located. Thus, access for the elderly, disabled, and the like is extremely difficult and often times hazardous.

Various attempts have been made in the past to overcome these problems and provide hand rail assemblies. These attempts can be seen by reference to several U.S. patents. U.S. Pat. No. 4,029,352, issued in the name of Evans, describes a foldable hand rail for a side entrance of a camper trailer. The Evans hand rail comprises a top end that is pivotally carried within a bracket that is mounted to the side of the camper. The hand rail swings up from a downwardly-hanging position to an outwardly inclined position during use and is supported by a pivotally mounted strut which is connected through the use of a throw arm.

U.S. Pat. No. 5,076,547, issued in the name of Osterholm, describes an apparatus and method for a collapsible hand rail for mounting on a wall structure adjacent to a doorway. The Osterholm apparatus comprises a plurality of mounting fixtures to which a hand rail structure is pivotally connected and a bracing bar that is connected between the wall structure and a post member of the hand rail structure and further comprises a collapsed position and an extended position.

U.S. Pat. No. 6,425,572, issued in the name of Lehr, describes a retractable, telescoping hand rail for recreational vehicles that extends or retracts for use with the retractable stairs of the vehicle are extended or retracted. The Lehr hand rail comprises an upper rail that is pivotally attached to an outer wall of the vehicle on one end and a lower rail that is pivotally attached to the stairs of the vehicle on one (1) end. The unattached ends of the upper rail and the lower rail are telescopingly engaged enabling the lower rail to extend downward and outward from the upper rail for use by a person entering the vehicle.

U.S. Pat. No. 6,843,468, issued in the name of Marshall et al., describes a hand rail and bracket assembly that comprises a pair of wall-mounted brackets having two (2) off-set channels that receive the hand rail.

Additional relevant attempts to address these problems can be seen by reference to several other U.S. patents, including U.S. Pat. Nos. 4,261,550, issued in the name of Gregory, which describes a foldable hand rail structure; 5,024,420, issued in the name of Downing, which describes a foldable hand rail assembly; 5,116,025, issued in the name of Kiniry, which describes a cantilevered, retractable hand rail; and 7,007,366, issued in the name of Eby, which describes a method for installing a foldaway hand rail to a vehicle.

Additionally, ornamental designs for hand rails exist, particularly, U.S. Pat. Nos. D 374,581 and D 509,905. However, none of these designs are similar to the present invention.

While these devices fulfill their respective, particular objectives, each of these references suffers from the one (1) or more of the common disadvantages of most attachable hand rails, which includes complex mechanical mounting assemblies, a lack of suitable stability to a user, and a deficiency in size to provide support to and from ground level. Accordingly, there exists a need for a means by which safe and easy hand rail support for recreational vehicle steps can be provided. The development of the present invention substantially departs from the conventional solutions and in doing so fulfills this need.

SUMMARY OF THE INVENTION

In view of the foregoing references, the inventor recognized the aforementioned inherent problems and observed that there is a need for an adjustable hand rail which is adaptable to various vehicle configuration and is easily installed, removed, and stored that is ideal for elderly or disabled users when entering and exiting a raised vehicle and thus, the object of the present invention is to solve the aforementioned disadvantages and provide for this need.

To achieve the above objectives, it is an object of the present invention to provide a detachable hand rail for a recreational vehicle that provides a means for easily attaching and detaching a rail assembly along a set of access steps that is intended to be used with motor homes, fifth wheels, travel trailers, campers, and any similar vehicle which have one (1) or more access steps.

Another object of the detachable hand rail for a recreational vehicle is to provide a device comprising a rail assembly further comprising an upper and a lower rail that are angled downwardly and away from the existing recreational vehicle, at least a first and a receiving paling which are attached to the upper and lower rails such that the upper and lower rails remain aligned parallel to each other during operating conditions, and a mounting assembly that is removably attached to a lower end of the rail assembly that comprises a receiving bracket having a first receiving end.

Yet still another object of the detachable hand rail for a recreational vehicle is to provide a lower rail comprising a first insertion end is located at a proximal end that is insertingly connected to the first receiving end.

Yet still another object of the detachable hand rail for a recreational vehicle is to provide a mounting assembly that is adapted to be attached to a mounting surface of the recreational vehicle.

Yet still another object of the detachable hand rail for a recreational vehicle it to provide a receiving bracket comprising an internally threaded fastening aperture through an outside surface and a first fastener which is threadably positioned into the fastening aperture.

Yet still another object of the detachable hand rail for a recreational vehicle is to provide a device comprising a leg having a second insertion end disposed at an upper portion which is inserted into a second receiving end of the receiving paling. The leg further comprises a foot disposed at a distal end which is adapted to be supported on a ground surface.

Yet still another object of the detachable hand rail for a recreational vehicle is to provide a lower rail that is located subjacent to the upper rail which provides a means to stabilize the rail assembly during operating conditions.

Yet still another object of the detachable hand rail for a recreational vehicle is to provide a device comprising the first insertion end which is inserted into the first receiving end of the receiving bracket and the first fastener which is threadably tightened, such that the first insertion end is clamped within the receiving bracket for statically maintaining the lower rail within the receiving bracket.

Yet still another object of the detachable hand rail for a recreational vehicle is to provide a device comprising a rib located around an entire perimeter of the first insertion end having an outer dimension larger than an outer dimension of the first receiving end which prevents the first insertion end from penetrating beyond a predetermined limit within the first receiving end of the receiving bracket.

Yet still another object of the detachable hand rail for a recreational vehicle is to provide a method of utilizing the device that provides access to recreational vehicle interiors in a manner which is not only quick, easy and effective, but safe as well.

Further objects and advantages of the detachable hand rail for a recreational vehicle will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| | |
|---|---|
| 10 | detachable hand rail for recreational vehicles |
| 20 | rail assembly |
| 21 | upper rail |
| 22 | lower rail |
| 23 | paling |
| 24 | first insertion end |
| 25 | rib |
| 26 | contact end |
| 27 | second receiving end |
| 28 | receiving paling |
| 29 | end cover |
| 30 | mounting assembly |
| 31 | mounting tab |
| 32 | mounting bracket |
| 33 | first receiving end |
| 34 | mounting aperture |
| 50 | leg |
| 51 | second insertion end |
| 55 | foot |
| 60 | first fastener |
| 62 | first fastener aperture |
| 64 | second fastener |
| 100 | vehicle |
| 105 | access steps |
| 110 | mounting surface |
| 115 | contact surface |
| 120 | access door |

DETAILED DESCRIPTION OF THE PREFERRED EMBODIMENT

The best mode for carrying out the invention is presented in terms of its preferred embodiment, herein depicted FIGS. 1 through 6. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a detachable hand rail for a recreational vehicle (herein described as the "device") 10, which provides a means for easily attaching and removing a rail assembly 20 therealong a set of access steps 105 of a recreational vehicle 100 or a similar vehicle. The device 10 is intended to be used with motor homes, fifth wheels, travel trailers, campers, and any similar vehicle 100 which comprises one (1) or more access steps 105.

Figure 1:
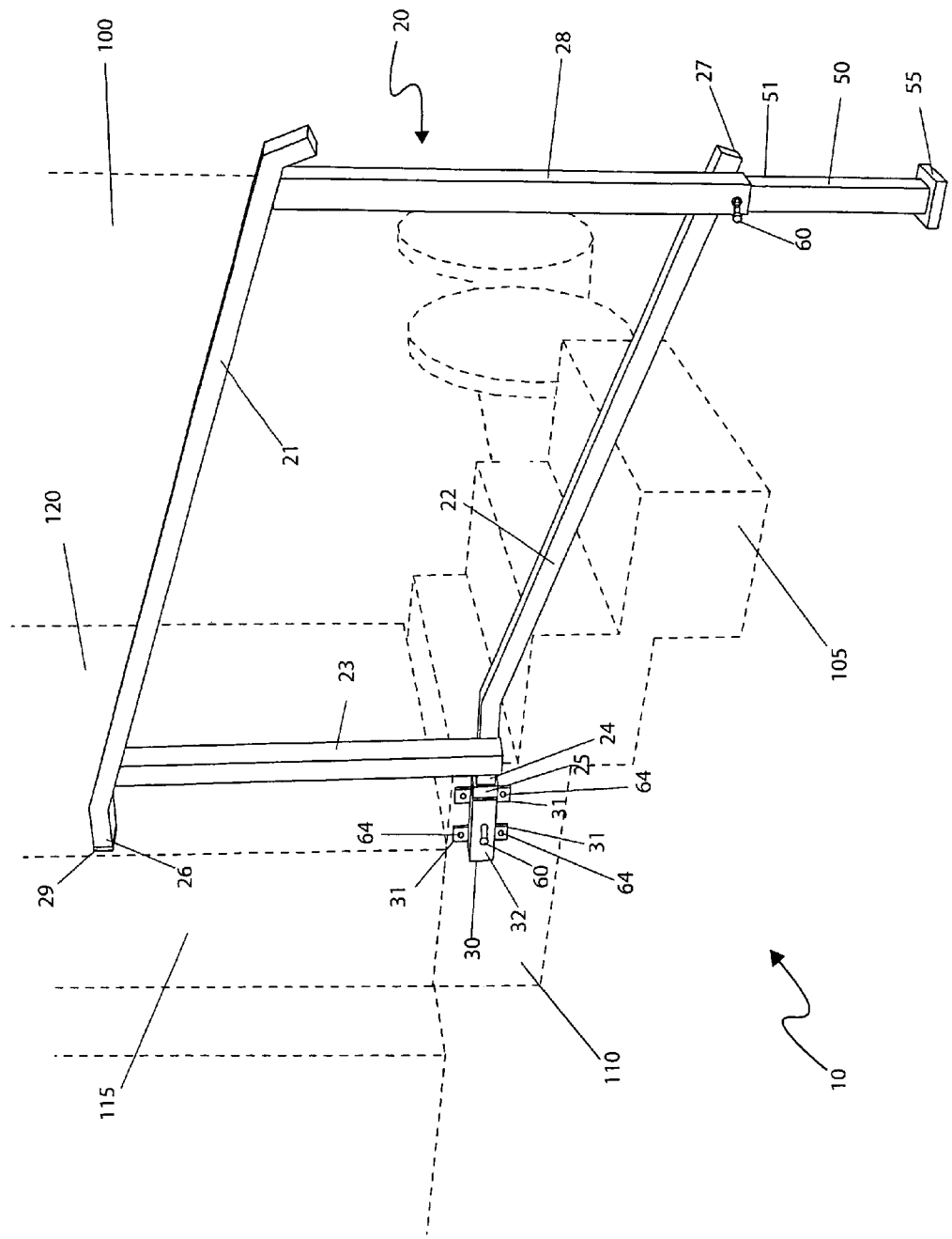
FIG. 1 is an environmental view of a detachable hand rail for a recreational vehicle 10, according to a preferred embodiment of the present invention.

Referring now to FIG. 1, an environmental view of the device 10, according to the preferred embodiment of the present invention, is disclosed. The device 10 preferably comprises square or round channel made of a durable, lightweight weather resistant material such as metal, thermoplastic, or the like and fabricated using standard manufacturing techniques. The device 10 generally comprises a rail assembly 20 and a mounting assembly 30. The rail assembly 20 removably attaches thereto the mounting assembly 20 thereat a lower end. The mounting assembly 30 is attached thereto a mounting surface 110 which is preferably a lower frame member of the vehicle 100 or a side frame portion of the access steps 105. The mounting assembly 30 is attached thereto the mounting surface 110 in such a manner as to not interfere with the deployment and operation of the access steps 105 or the operation of the vehicle 100. The rail assembly 20 is removably connected thereto the mounting assembly 30 when in an in-use state as depicted in FIG. 1. The rail assembly 20 is further intended to be laid flat or hung when in a stowed state.

Figure 2:
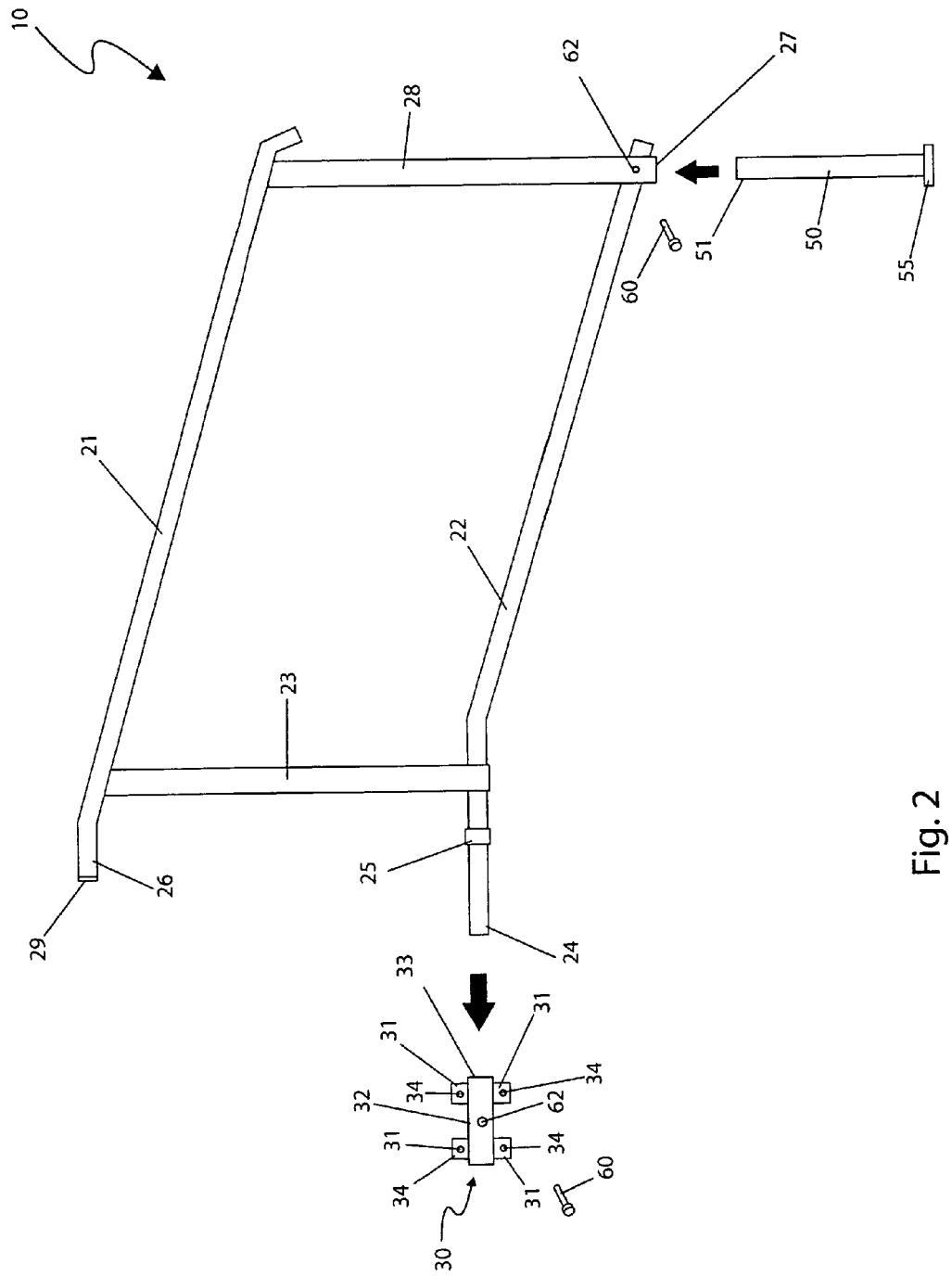
FIG. 2 is an exploded view of the detachable hand rail for a recreational vehicle 10, according to a preferred embodiment of the present invention.

Referring now to FIG. 2, an exploded view of the device 10, according to the preferred embodiment of the present invention, is disclosed. The rail assembly 20 comprises an upper rail 21, a lower rail 22, at least one (1) paling 23, and a receiving paling 28. The upper rail 21 provides a gripping and support member to a user of the device 10 and comprises a generally downward angle therefrom a contact surface 115 which approximates a slope of the access steps 105. The upper rail 21 further comprises an end cover 29 which is located thereon an outside vertical surface of the contact end 26 of said upper rail 21. The end cover 29 comprises a material such as rubber or the like and provides a means of protection to the contact surface 115 when the contact end 26 of the upper rail 23 rubs against said contact surface 115, thus preventing damage to the outer wall of the vehicle 100. The lower rail 22 is subjacent thereto the upper rail 21 and provides a means of support and stability thereto the rail assembly 20. The rail assembly 20 further comprises at least one (1) paling 23 and a receiving paling 28 which are attached therebetween the upper rail 21 and the lower rail 22 and provide a means of stability and support thereto the same. The rail assembly 20 may further comprise any plurality of palings 23 spread throughout the length of the upper and lower rails 21, 22 to provide appropriate support depending upon the size of device 10. A first insertion end 24 is located thereon a proximal end of the lower rail 22 and is insertingly connected thereinto a first receiving end 33 which is located thereon the mounting assembly 30. The first insertion end 24 comprises a generally horizontal length which is appropriately sized as to be inserted thereinto a receiving bracket 32 of the mounting assembly 30. The mounting assembly 30 comprises an internally threaded fastening aperture 62 located therethrough an outside surface of the mounting bracket 32 which accepts a first fastener 60. The first fastener 60 comprises a clamping bolt or the like which makes contact therewith the inserted first insertion end 24 and locks the same.

The device 10 further comprises a leg 50 which provides an adjustable means of support to a distal end of the rail assembly 20. The leg 50 is preferably made of a similar material as that of the rail assembly 20 and comprises an outer dimension which is appropriately sized as to be insertingly connected thereinto a second receiving end 27 of the receiving paling 28. The receiving paling 28 comprises the last and outer paling 23 of the rail assembly 20 and receivingly accepts a second insertion end 51 which comprises an upper portion of the leg 50. A foot 55 is located thereon a distal end of the leg 50 and comprises a large base which provides additional ground contact surface area. The second receiving end 27 is located thereon a lower end of the receiving paling 28 and comprises a receiving aperture 62 which threadingly accepts a first fastener 60 which locks the leg 50 into a desired position and height.

Figure 3:
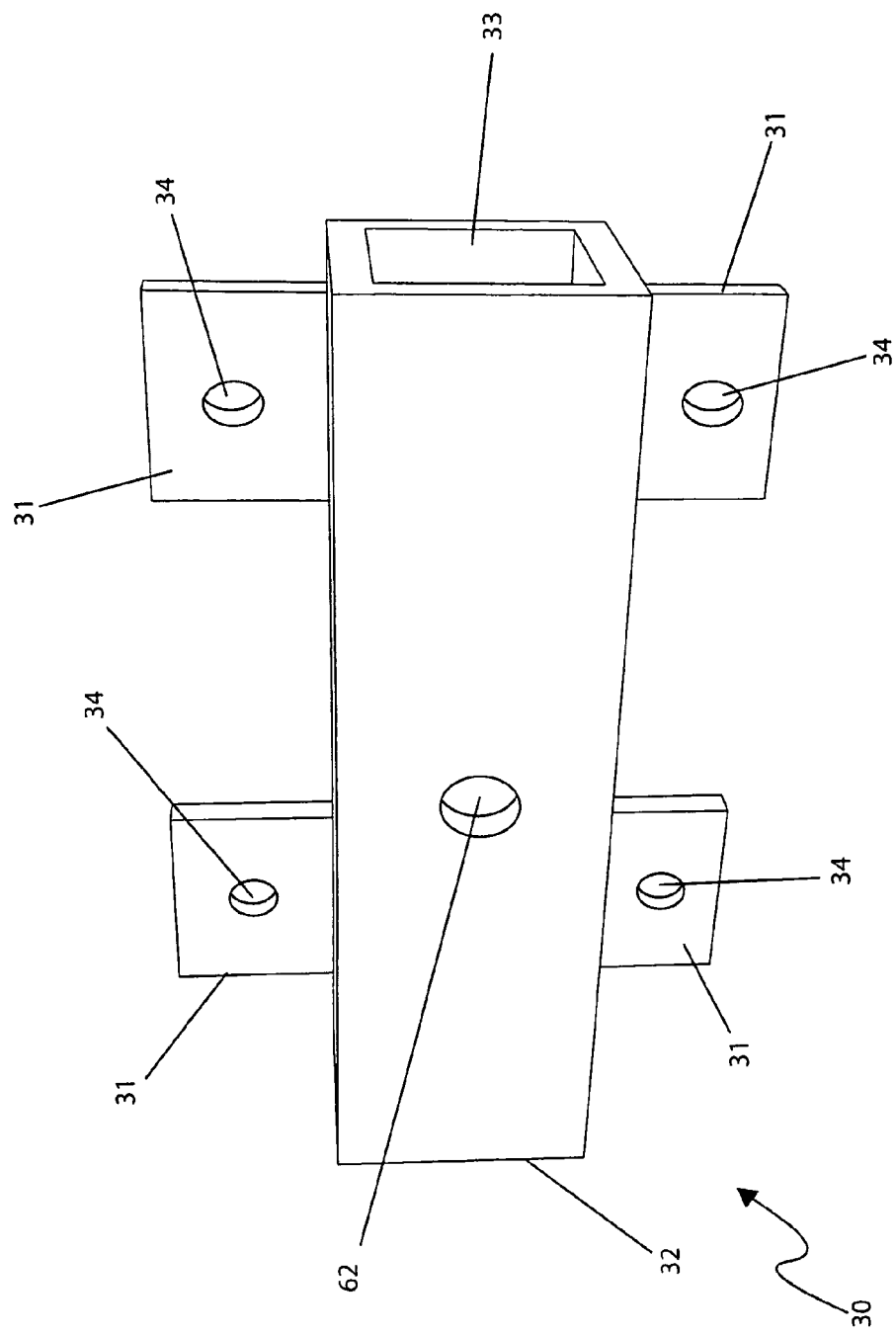
FIG. 3 is a perspective view of a first mounting assembly 30, according to a preferred embodiment of the present invention.

Referring now to FIG. 3, a perspective view of the mounting assembly 30, according to the preferred embodiment of the present invention, is disclosed. The mounting bracket 32 comprises a tubular member and a first receiving end 33. The mounting assembly 30 further comprises a plurality of vertical mounting tabs 31. The mounting tab 31 comprises at least one (1) mounting aperture 34 therethrough. The mounting apertures 34 align therewith corresponding apertures which are drilled therein the mounting surface 110 during the preparation and installation process. The mounting assembly 30 is attached thereto the mounting surface 100 via a plurality of second fasteners 64 which are preferably standard mechanical hardware such as nuts, bolts, screws, or the like.

Figure 4:
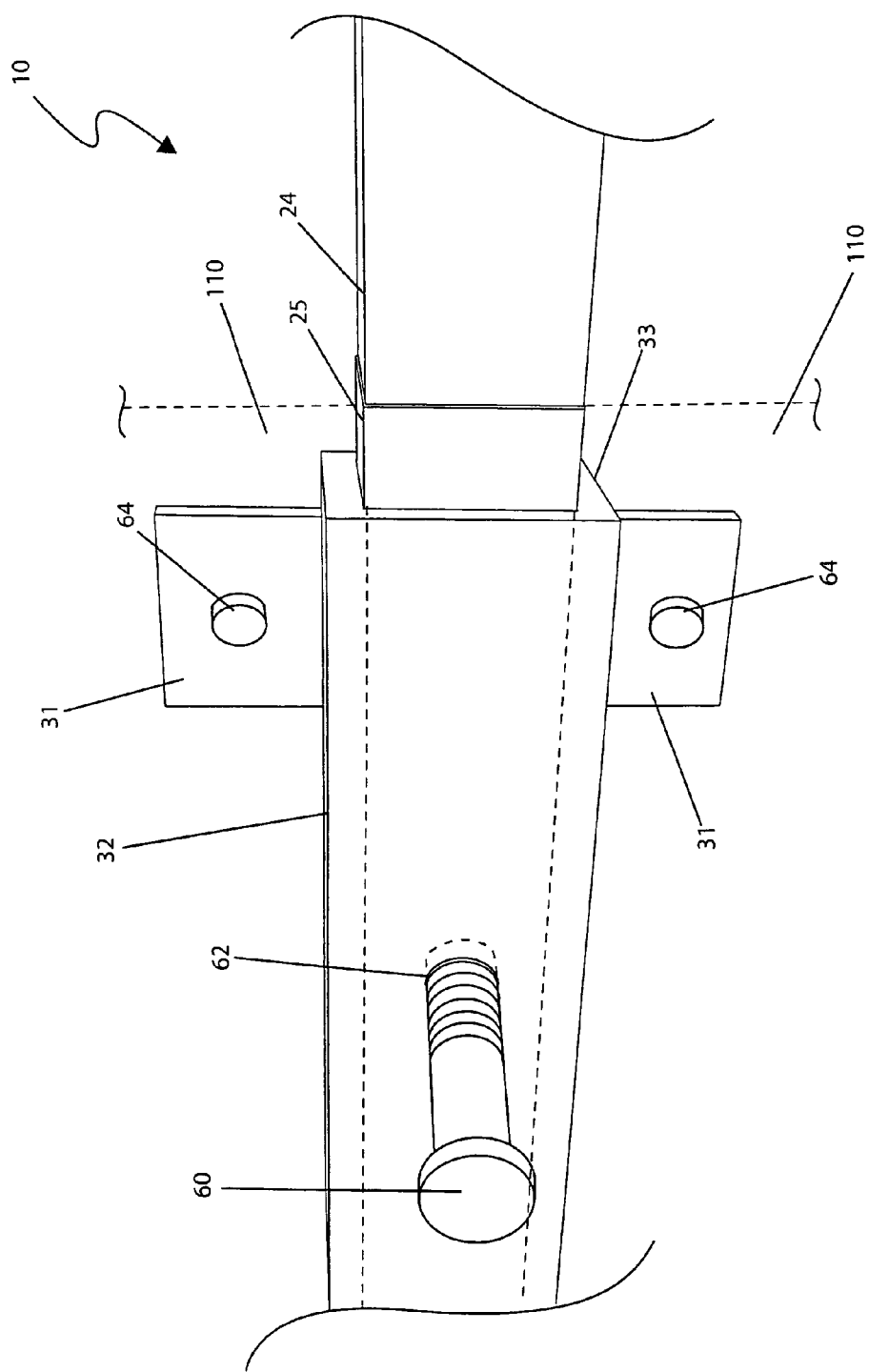
FIG. 4 is a close up view of the detachable hand rail for a recreational vehicle 10 depicting a first insertion end 24 and a first receiving end 33, according to a preferred embodiment of the present invention.

Referring now to FIG. 4, a close up view of the device 10 depicting a first insertion end 24 and a first receiving end 33, according to the preferred embodiment of the present invention, is disclosed. The rail assembly 20 further comprises a rib 25 located therearound the first insertion end 24 which comprises an outer dimension larger than that of the first receiving end 33, thus providing a means of maximum insertion thereto said rail assembly 20. The first insertion end 24 is inserted thereinto the first receiving end 33 of the mounting assembly 30 and the first fastener 60 is threadingly tightened such that said first insertion end 24 is clamped therewithin the mounting bracket 32, thus locking the same into position.

Figure 5:
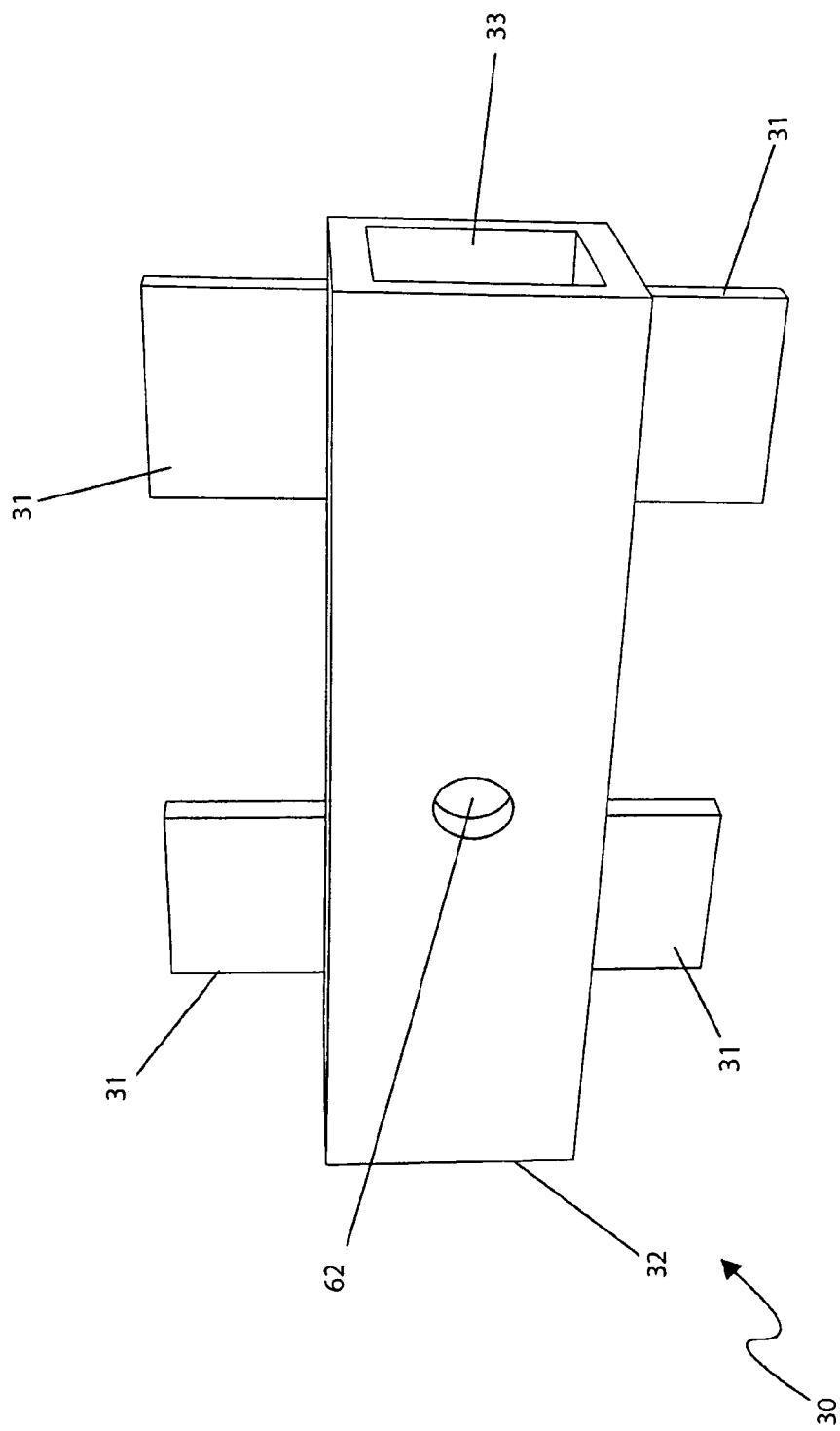
FIG. 5 is a perspective view of the first mounting assembly 30, depicting an alternate method of installation, according to a preferred embodiment of the present invention; and, FIG. 6 is a perspective view of the first mounting assembly 30, depicting yet another method of installation, according to a preferred embodiment of the present invention.

Referring now to FIG. 5, a perspective view of the mounting assembly 30 depicting an alternate method of installation, according to the preferred embodiment of the present invention, is disclosed. The mounting assembly 30 may alternatively be attached thereto the mounting surface 110 via welding or the like and alternatively introduced comprising a plurality of mounting tabs 31 lacking the mounting apertures 34.

Figure 6:
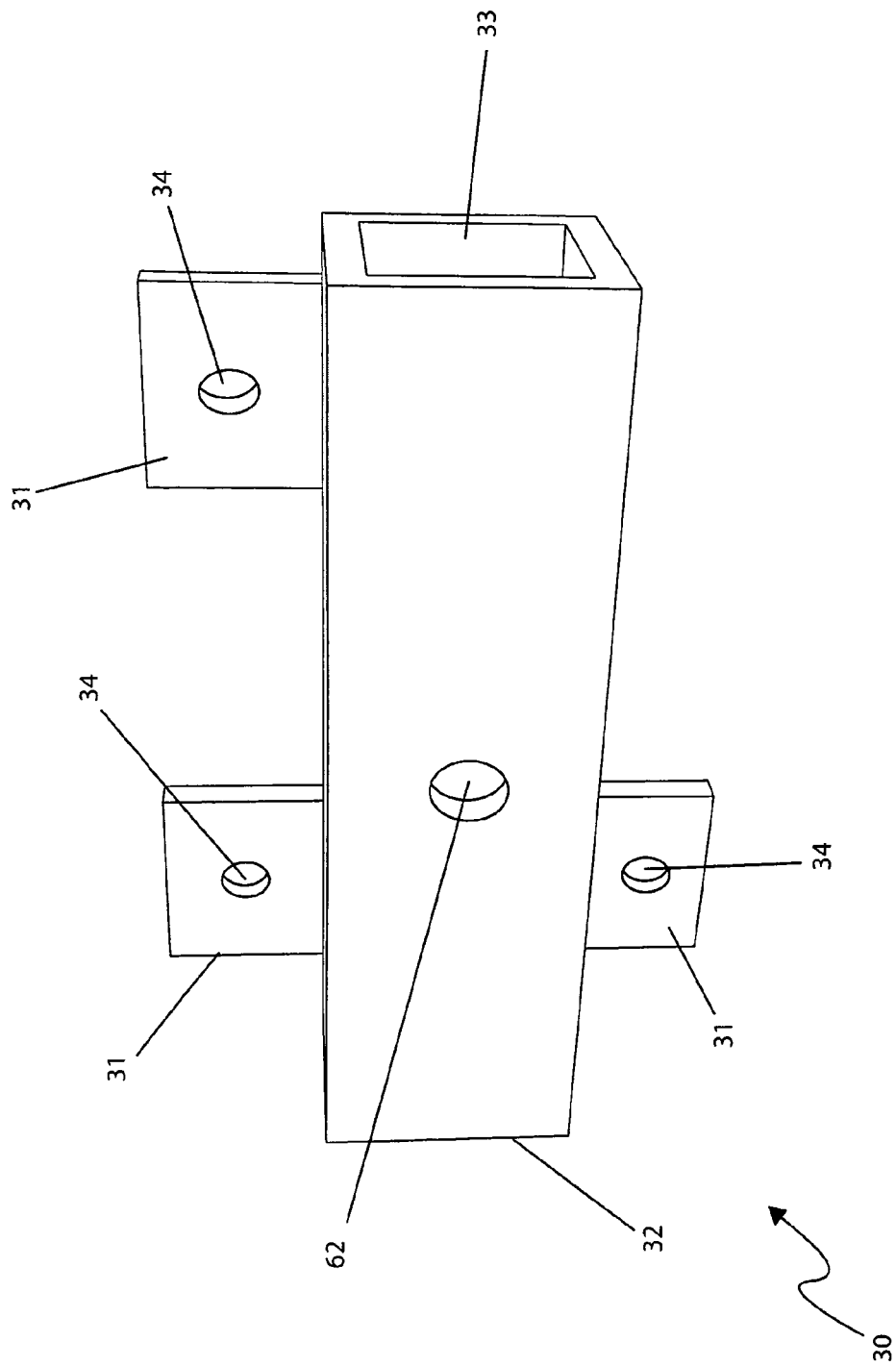

Referring now to FIG. 6, a perspective view of the mounting assembly 30 depicting yet another alternate method of installation, according to the preferred embodiment of the present invention, is disclosed. The mounting assembly 30 provides a means for removing any one (1) or more mounting tabs 31 as needed due to structural interferences thereon the mounting surface 110.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIGS. 1, 2, and 4 and alternatively in FIGS. 5 and 6.

The method of utilizing the device 10 may be achieved by performing the following steps: preparing the vehicle 100 for attachment of the mounting assembly 30 by pre-drilling apertures therein the mounting surface 110 which align therewith the mounting apertures 34 therein the mounting tabs 31; attaching said mounting assembly 30 thereto said mounting surface 110 via the second fasteners 64; connecting the rail assembly 20 thereto said mounting assembly 30 by insertingly connecting the first insertion end 24 thereinto the first receiving end 33; engaging the first fasteners 60, thereby locking said rail assembly 20 thereto said mounting assembly 30; extending the leg 50 to an appropriate height such that the foot 55 is in contact with the outside ground surface; locking the leg 50 into position by engaging and tightening the first fastener 60; entering and exiting the access door 120 in a normal manner utilizing the access steps 105 and said device 10 for additional support; removing said rail assembly 20 therefrom said mounting assembly 30 when not in use; stowing said rail assembly 20 in a flat location, hanging from a hook, or the like for transport and during vehicle 100 operation; and, benefiting from the increased safety and additional support afforded a user of the present device 10.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A hand rail assembly for use with access steps for an existing recreational vehicle, said handrail assembly comprising:
    a rail assembly including upper and lower rails angled downwardly and away from the existing recreational vehicle, said rail assembly further including first and receiving palings respectively attached to said upper and lower rails such that said upper and lower rails remain aligned parallel to each other during operating conditions;
    a mounting assembly removably attached to a lower end of said rail assembly, said mounting assembly including a receiving bracket having a first receiving end formed therein; and,
    a rib located around an entire perimeter of a first insertion end and thereby having an outer dimension larger than an outer dimension of said first receiving end to thereby prevent said first insertion end from penetrating beyond a predetermined limit within said first receiving end of said receiving bracket;
    wherein said first insertion end is located at a proximal end of said lower rail and is insertingly connected to said first receiving end;
    wherein said mounting assembly is adapted to be attached to a mounting surface of the existing recreational vehicle; and,
    wherein said lower rail is located subjacent to said upper rail and thereby stabilizes said rail assembly during operating conditions;
    a leg having a second insertion end disposed at an upper portion of said leg, said second insertion end being linearly inserted into a second receiving end of said receiving paling, said leg further having a foot disposed at a distal end of said leg, wherein said foot is adapted to be supported on a ground surface;
    wherein said leg has a single and unitary body vertically aligned with said receiving paling, said second receiving end beginning located proximate to said lower rail; and,
    wherein each of said leg and said receiving paling has a square cross-section thereby prohibiting said leg from rotating relative to said receiving paling.

2. The hand rail assembly of claim 1, wherein said receiving bracket comprises:
    an internally threaded fastening aperture formed through an outside surface thereof; and,
    a first fastener threadably positioned into said fastening aperture;
    wherein said first insertion end has a horizontal length and is thereby linearly inserted into said first receiving end of said receiving bracket.

3. The hand rail assembly of claim 2, wherein said first fastener is a clamping bolt engaged with said first insertion end and thereby maintains said lower rail at a static position within said receiving bracket.

4. The hand rail assembly of claim 1, wherein said second receiving end is located at a lower end of said receiving paling and is provided with a receiving aperture threadingly engaged with a fastener which locks said leg into a desired position and height.

5. The hand rail assembly of claim 4, wherein said first insertion end is inserted into said first receiving end of said receiving bracket and said first fastener is threadably tightened such that said first insertion end is clamped within said receiving bracket for statically maintaining said lower rail within said receiving bracket.

6. The hand rail assembly of claim 1, wherein said receiving bracket further comprises:
    a tubular member having a mounting aperture formed through a wall thereof;
    a plurality of vertical mounting tabs attached to a rear side of said tubular member, each of said vertical mounting tabs having an aperture formed at an end thereof respectively; and,
    a plurality of second fasteners penetrated through said mounting apertures and thereby adapted to be affixed to a support wall.

7. The hand rail assembly of claim 6, wherein said mounting tabs are removably coupled to said receiving bracket.

* * * * *